Aug. 24, 1937.  V. E. PEARSON  2,090,698
NUT THREADING MACHINE
Filed Aug. 8, 1935  6 Sheets-Sheet 3

INVENTOR
Victor E. Pearson
BY Pope + Pope
ATTORNEYS

Aug. 24, 1937.   V. E. PEARSON   2,090,698
NUT THREADING MACHINE
Filed Aug. 8, 1935   6 Sheets-Sheet 5

INVENTOR
Victor E. Pearson
BY
ATTORNEY

Patented Aug. 24, 1937

2,090,698

UNITED STATES PATENT OFFICE 2,090,698

NUT THREADING MACHINE

Victor E. Pearson, Buffalo, N. Y., assignor, by mesne assignments, to The Waterbury Farrel Foundry and Machine Company, Waterbury, Conn., a corporation of Connecticut Application August 8, 1935, Serial No. 35,325

6 Claims. (Cl. 10—133)

This invention relates to a machine for cutting screw threads in the bores of nut blanks for the purpose of completing them into screw nuts.

In nut threading machines of this character as heretofore constructed having a stationary tap and a rotary spindle or chuck the working parts of the tap and spindle have been concealed from view so that the operator was unable to see how the machine was working because the work was done internally and the chips formed during the threading operation were also confined around the tap and within the spindle so that these chips would be ground and produce a clogging or choking of the space between the spindle and the tap, thus causing undue wear on the tap and reducing the accuracy of the nuts produced by the machine.

In the present construction the spindle which revolves around the stationary tap has radial passages through which the chips can escape freely and the space around the spindle and tap is unobstructed so that the operative cutters of the tap and the lands of the spindle are visible to the operator and thus enables him to operate the machine for obtaining the highest efficiency and output.

Furthermore, in machines of this character the means for guiding the screw nuts over the tap during the threading operation were unduly long and therefore necessitated building the machine of a length which required an excessive amount of space to accommodate the same.

Moreover, the mechanism heretofore known for moving or stripping the nuts from the shank of the tap after the completion of the threading operation was unduly complicated, noisy in operation and required an unnecessary amount of power for its operation.

It is one of the objects of this invention to provide a nut threading machine in which the means for guiding and driving the screw nut or blank while the same is being threaded by the tap is so organized that the operation of threading a nut is at all times visible to the attendant so that he can observe the progress of the work and govern himself accordingly and this organization provides that the chips or shavings which are removed from the nut by the tap are capable of escaping promptly from the nut and tap so that the same are not re-cut and also do not tend to clog the machine so that heating of the tap and nut and adjacent parts of the machine are avoided and less power is required for operating the machine.

Another object of this invention is to provide improved and simplified means for stripping or moving the nuts which are threaded lengthwise away from the tap and to accomplish this purpose without producing any noise and with a minimum expenditure of power.

Further objects of this invention are to so organize the nut threading and stripping mechanism above referred to so that the same are not liable to get out of order and are readily accessible for inspection, adjustment and repairing.

In the accompanying drawings.

In the following description similar characters of reference indicate like parts in the several views of the drawings.

Referring to Figs. 1–23, the numeral 30 represents the main frame of the machine which may be of any suitable construction to support the various working parts. In its general organization this machine comprises means for feeding the nuts or blanks 31 which are to be threaded on the bore or central opening thereof, means for cutting the thread on the nuts, and means for stripping the nuts from the thread cutter and delivering the same from the machine.

Although the feeding means may vary the same, as shown in the drawings, are preferably constructed as follows:

The numeral 32 represents an upright guide chute or spout into the upper end of which the nuts to be threaded are supplied from any suitable source and in any desired manner. The nuts descend in this chute by gravity in the form of a stack or train and the lowermost one rests on a shelf or stop 33 at the bottom of the chute. The nuts are successively moved backwardly from the lower end of the stack in the chute to the threading mechanism and thereafter the stack of nuts drops and brings the next upper nut into the lowermost position against the stop 33, this operation proceeding continuously while the machine is working and the nuts are supplied to the chute.

The numeral 34 represents a horizontally and longitudinally reciprocating plunger which is adapted to feed the nuts one at a time from the feed chute to the threading mechanism. When in its foremost position this plunger is arranged with its face or front end immediately in rear of an opening 35 in the lower part of the front wall of the chute in line with the lowermost nut resting on the shelf 33. As the plunger moves rearwardly it carries the lowermost nut with it from under the stack and delivers the same to the threading mechanism, and during this time the next lower nut of the stack rests on the plunger. When however the plunger is again retracted to its foremost position it clears the stack of nuts and permits the same to drop until the next nut engages the stop 33.

Figures 1, 2, 3:
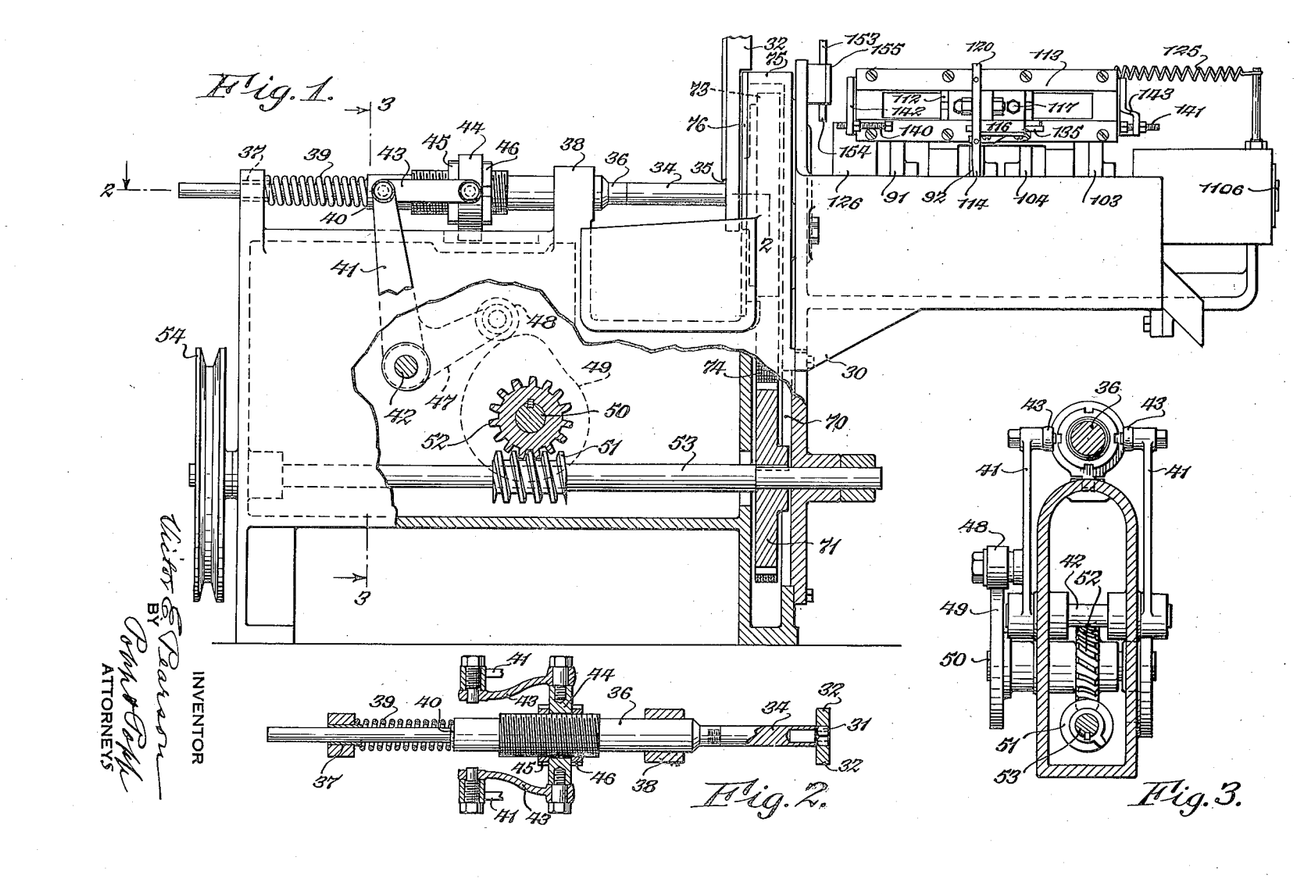
Fig. 1 is a fragmentary side view of the nut threading machine embodying my improvements.
Fig. 2 is a horizontal section, taken on line 2—2, Fig. 1.
Fig. 3 is a vertical transverse section, taken on line 3—3, Fig. 1.

The plunger is detachably mounted on the rear end of a horizontal longitudinal plunger rod 36 which slides with its front and rear parts in guides 37, 38 on the main frame and the rearward movement of the plunger rod and the parts connected therewith is effected by a spring 39 surrounding the front part of the plunger rod and engaging its front end with the front guide 37 and its rear end with a shoulder 40 on the plunger rod. The forward movement of the plunger rod is effected by means of a pair of rock arms 41 arranged on opposite sides of the plunger rod and having their lower ends connected with a horizontal rock shaft 42 journaled transversely in the main frame, while their upper ends are connected by links 43 with opposite sides of a shifting collar 44 which is mounted on the central part of the plunger rod and is capable of longitudinal adjustment thereon by means of clamping rings 45, 46 threaded on the plunger rod and engaging the front and rear sides of the shifting collar, as shown in Figs. 1 and 2.

The rock shaft is provided with a rearwardly projecting actuating arm 47 having a roller 48 which engages the peripheral face of a rotary cam 49. The latter is mounted on a horizontal shaft 50 journaled transversely in the main frame and rotated by a worm 51 meshing with a worm wheel 52 on the cam shaft 50 and a horizontal driving shaft 53 journaled lengthwise in the main frame and carrying the worm 51 and operated by a power belt passing around a pulley 54 on the driving shaft, or in any other suitable manner.

By this means the plunger is moved rearwardly with a yielding pressure for feeding the nuts from the chute to the tapping mechanism but the return movement of the plunger is positive, thereby avoiding injury to the machine in case the same becomes clogged for any reason.

As each nut or blank is discharged rearwardly from the lower end of the feed chute by the feed plunger the same is received in the bore of a tubular driving spindle, which latter in the present instance is rotated and so constructed that it rotates the nut while the latter has a screw thread cut in its bore by the cutters 55 at the front end of a tap and also guides the nut while moving lengthwise of the tap during the threading operation. In its preferred form the driving spindle is provided with a front tubular hub 56 which is axially in line with the plunger, and a plurality of driving and guiding arms 57 arranged in an annular row and projecting longitudinally rearward from the rear side of said hub.

These driving arms are separated from each other circumferentially by intervening clearance passages 58. The rear ends of the driving arms are disconnected and each of these arms is provided on its inner side with a longitudinal driving land 59 which is adapted to engage with the rear side of a corner of the nut which is being threaded.

Figures 22, 23, 24, 25, 26:
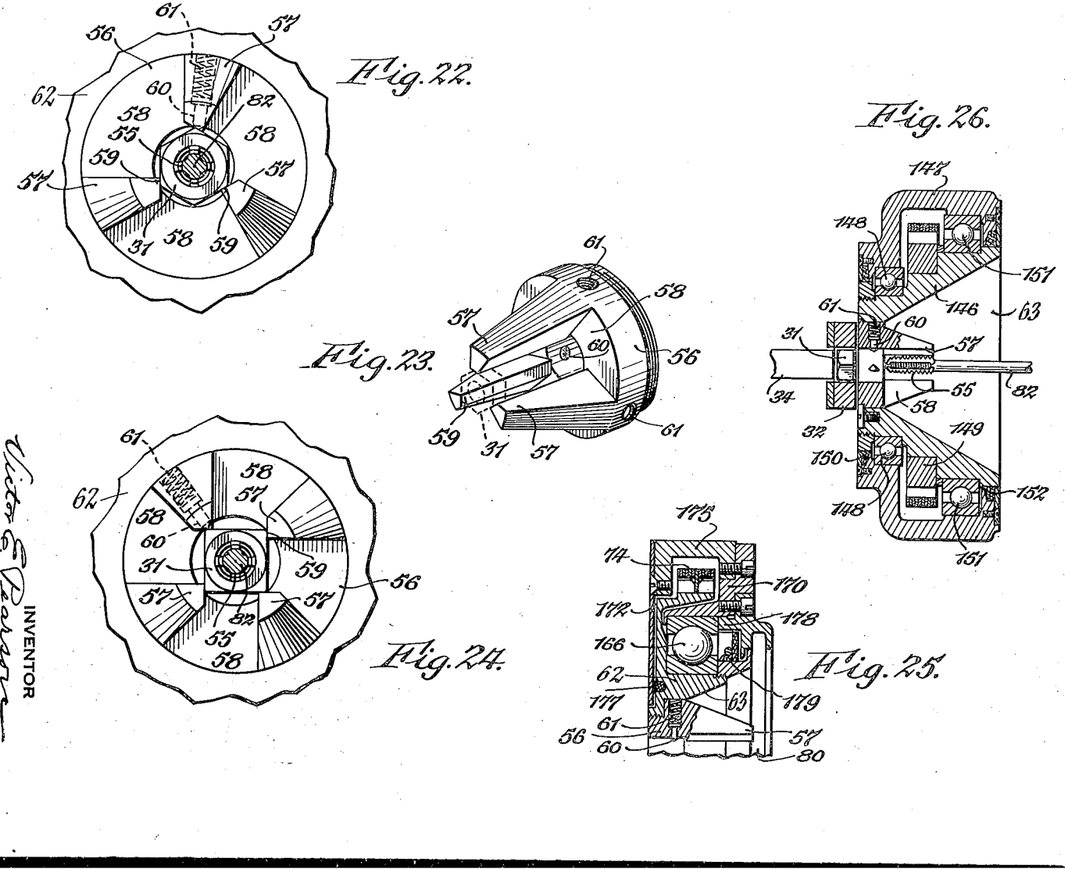
Fig. 22 is a vertical transverse section, on an enlarged scale, taken on line 22—22, Fig. 8 and showing the nut driving spindle provided with three driving and three nut guiding and driving arms.
Fig. 23 is a perspective view of the nut driving and guiding spindle, shown in Figs. 8 and 22.
Fig. 24 is a cross section similar to Fig. 22 but showing a nut driving and guiding spindle provided with four guiding and driving arms.
Fig. 25 is a fragmentary longitudinal section showing a modified form of the driving head which supports the driving spindle and also the means for rotatably mounting said head, as compared with the construction of the corresponding mechanism shown in Fig. 8.
Fig. 26 is a longitudinal section showing another modification of the means for rotatably supporting the driving head which carries the driving spindle and mounting the same within a housing of the main frame.

When threading nuts having a hexagonal perimeter three driving arms are preferably employed on the driving spindle, the lands of which engage the rear sides of alternate corners of the nut, as best shown in Fig. 22, but when threading nuts having a square perimeter a driving spindle is employed having four driving arms 57, each of which is adapted to engage with the rear side of one of the corners of the square nut, as shown in Fig. 24. As the nut is pushed rearwardly from the feed chute by the plunger the same first passes through the bore of the hub of the driving spindle and then between the several driving arms thereof which surround and are transversely opposite the cutters of the screw threading tap.

If the rear sides of the corners of the nut upon passing between the driving arms are in line with lands of the latter, then the same will immediately engage the respective sides of the nut corners and turn the nut while passing over the cutters of the tap. But if the nut corners are in line with the salient parts of the lands of the driving spindle conflict of these corners with said parts is prevented by shunting means consisting preferably of a plurality of shunting pins 60 each of which is guided radially on the hub of the driving spindle and yieldingly moved inwardly by a spring 61 in this hub, so that the conical inner end of the respective shunting pin projects from the bore of the hub 56 across the front end of the salient part of the respective land. By this means the corners of the nut when in line with the salient parts of the driving lands will engage with the shunting pins and be thereby deflected so as to slightly rotate the nut and permit the nut corners to clear said salient parts and enable the nut to pass rearwardly between the driving arms and over the cutters of the tap and to be rotated at this time by engagement of the lands with the nut corners.

As the thread is being cut on the nut by the cutters of the tap the metal clips or shavings formed during this operation escape immediately laterally through the passages between the driving arms of the spindle to the exterior thereof, and therefore are not recut or ground up into fine particles by the tap as would be the case if the chips or shavings were confined closely around the tap until they reached the rear end of the same. This is accomplished by mounting the driving spindle on a rotary driving head 62 so that only the front part of this head engages with the hub of the spindle while the rear part 63 of the bore of this head is flared rearwardly and forms an annular clearance space between the driving arms and the transversely opposite rear part of the driving head which affords a passageway of ample area through which the chips or shavings removed from the nuts by the cutters of the tap can flow freely rearwardly from the tap and driving spindle.

The laterally outward movement of the chips from the nuts and through the longitudinal passages between the driving lands of the driving head is produced by the centrifugal force resulting from the rotation of the driving head and spindle and this force causes the chips to be discharged from said passages against the flaring bore or surface 63 of the driving head. Upon contacting the flaring bore of the driving head the chips are moved by centrifugal force lengthwise of this flaring bore from the small end toward the large end thereof and escape from the last mentioned end.

Figures 8, 9, 10, 11:
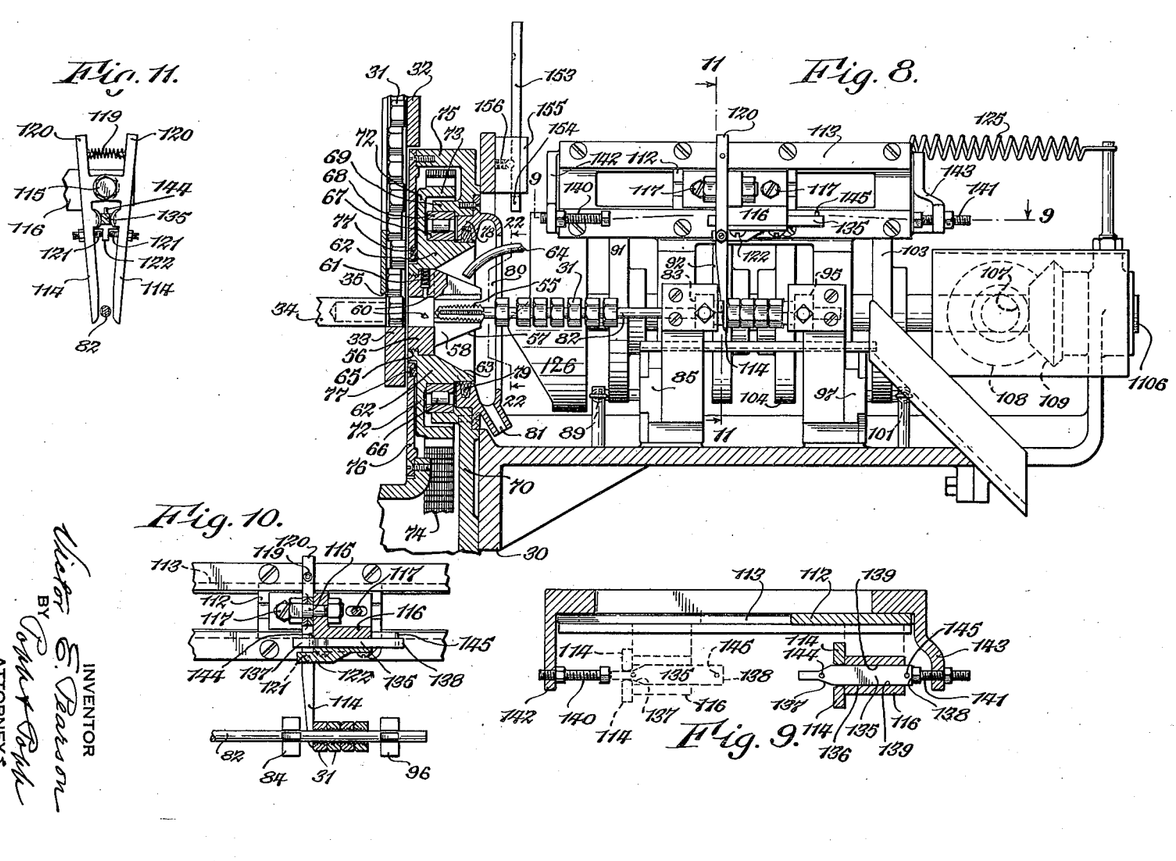
Fig. 8 is a fragmentary vertical longitudinal section of the machine, taken on line 8—8, Fig. 4.
Fig. 9 is a fragmentary longitudinal section, taken on the correspondingly numbered line in Fig. 8.
Fig. 10 is a fragmentary vertical longitudinal section, taken on line 10—10, Fig. 4.
Fig. 11 is a vertical transverse section, taken on line 11—11, Fig. 8.
Figure 12:
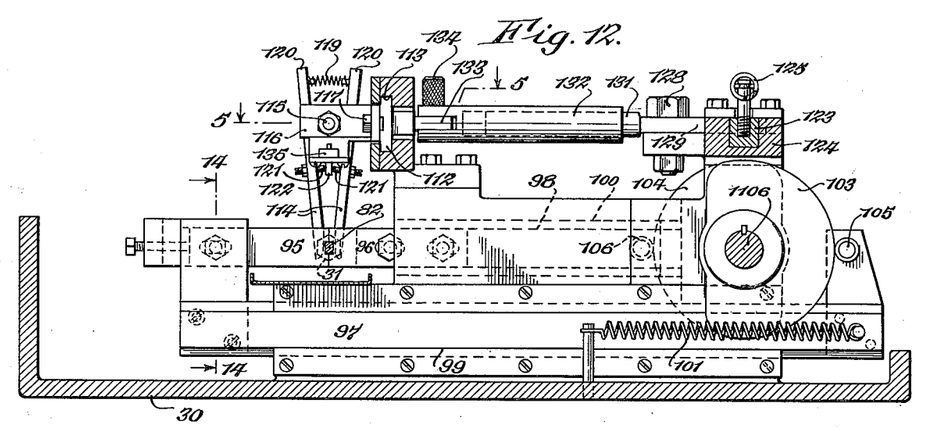
Fig. 12 is a vertical transverse section, taken on line 12—12, Fig. 4 and showing the nut stripping mechanism in one position.

Excessive friction on the tap and spindle is thus prevented, thereby avoiding generating too much heat which would involve waste of liquid coolant for preventing undue heating, and also preventing the machine from running hard and wasting power. Such coolant as may be required is supplied over the top of the arms of the driving spindle by a pipe 64 which extends forwardly into the upper rear part of the driving head, as shown in Fig. 8. This pipe 64, it will be noted, extends substantially longitudinally of the spindle and is so aimed that the liquid coolant which is ejected forwardly and downwardly therefrom is caused to flow toward the annular space intermediate of the tap shank and the lands 59 of the spindle. Because of this arrangement a considerable body of the liquid coolant is built up within the interior of the spindle rearwardly of the nut being tapped. It has been found that this result cannot be satisfactorily obtained when the coolant is directed in such manner as to pass more or less radially inwardly and thus to strike the lateral faces of the arms 58 of the spindle and thereby to be thrust laterally and outwardly away from the open central part of the spindle by centrifugal force.

By uncovering the rear part of the driving spindle in the manner shown and described the cutters of the tap and the rear part of the driving spindle in engagement with the nut are clearly visible and thus enables the attendant to clearly observe the manner in which the threading operation is progressing, thus assuring the most satisfactory product and performance of the machine.

The connection between the driving spindle and the driving head is preferably effected by a screw joint 65 which trends opposite to the direction of rotation of the spindle while tapping a nut, thereby preventing the driving spindle from unscrewing while in operation.

Various means may be employed for rotatably mounting the driving head on the main frame, the means for this purpose in Fig. 8 consisting of a single roller bearing comprising an annular row of bearing rollers 66 arranged between an inner bearing ring 67 mounted on the central part of the periphery of the driving head and an outer bearing ring 68 supported on the inner side of an annular flange 69 projecting forwardly from a transverse wall 70 forming part of the main frame.

Motion may be imparted to the driving head and the parts mounted thereon by any suitable means, for example by the means shown in Figs. 1 and 8 which comprise a driving chain belt wheel 71 secured to the driving shaft 53, a driven chain belt wheel having a web 72 projecting laterally from the front part of the driving head and a rim 73 projecting rearwardly from the periphery of the web 72 over the flange 69, and a silent chain belt 74 passing around said wheels 71, 73.

That part of the main frame adjacent to the tapping mechanism is preferably constructed to form an enclosure for the same and also prevent any coolant from reaching the rolling bearing of the driving head and also confine the lubricant of this rolling bearing thereto as much as possible. To that end a housing for the rolling bearing of the tapping mechanism is provided, of which the rear wall 70 forms a member and extends transversely across the rear sides of the driven and driving belt wheels 71, 73 and the belt 74 associated therewith, a horizontal flange 75 projecting forwardly from the margin of the rear wall 70, a front wall 76 extending transversely across the front side of the driving head, the driven belt wheel 73 and the upper part of the belt 74, and detachably connected with the flange 75 and the adjacent part of the main frame, a front packing 77 interposed between the inner edge of the front wall 76 and the front side of the driving head, a circular bushing 78 secured in the central part of the rear wall 70, and a rear packing 79 interposed between the bushing and the rear part of the periphery of the driving head.

In order to control the disposition of the chips which are cut from the nuts and the coolant which is delivered to the tapping mechanism by the pipe 64, the bushing 78 is provided in rear of the driving head with an annular inwardly opening trough 80 which catches the chips and the coolant thrown off by centrifugal force from the large rear end of the driving head, and directs the same to a spout 81 leading from the lower part of this trough to the lower part of the machine where the same is gathered in a sump for repeated use.

This construction of tapping mechanism not only permits of cutting the threads on nuts easily, quickly and without undue heating or waste of power, but it also permits of making the machine much shorter and more compact, thereby reducing the distance which the nut has to travel during the threading operation, also reducing the cost of the machine and also permitting installation of the same where only a limited amount of space is available.

Figures 4, 5, 6, 7:
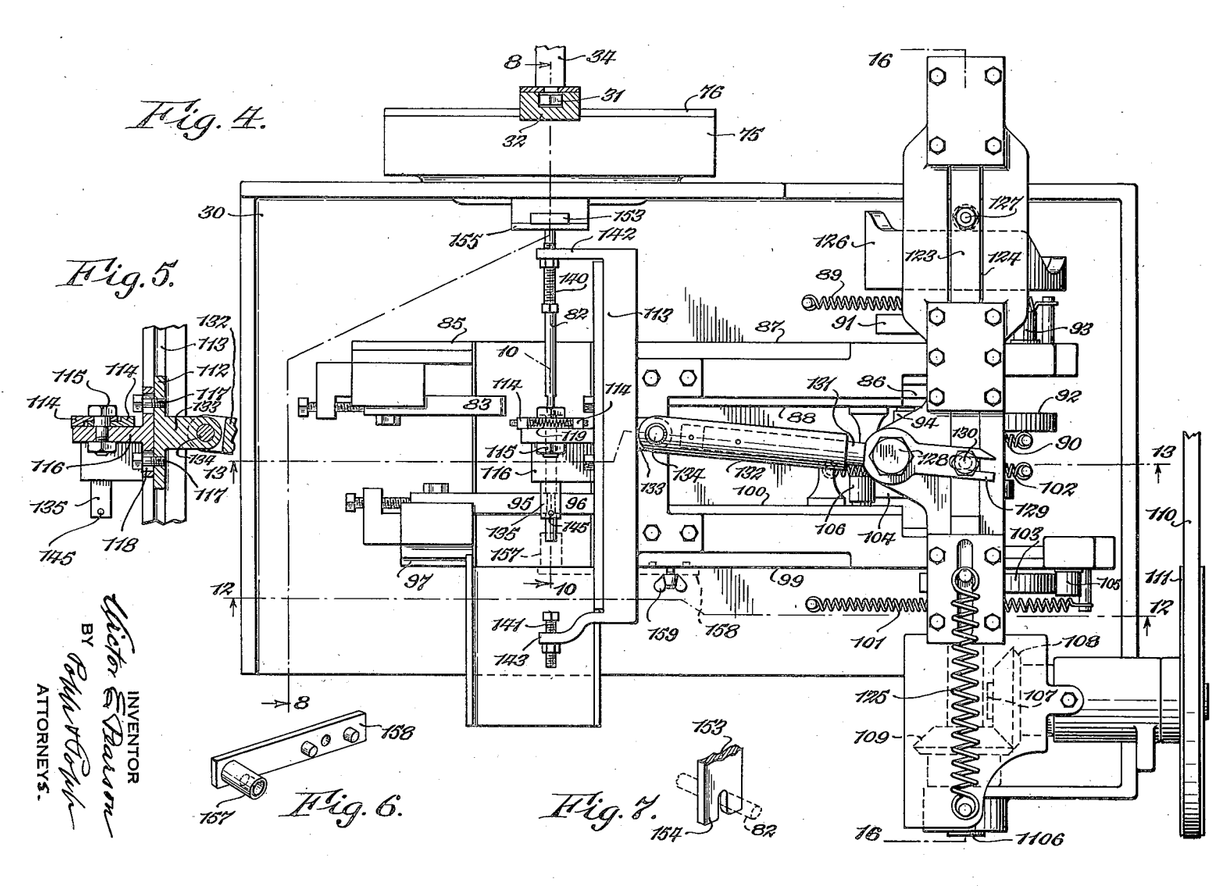
Fig. 4 is a fragmentary top plan view of the machine on an enlarged scale and showing more particularly the means for stripping the nut from the tap after the threading operation.
Fig. 5 is a fragmentary horizontal section, taken on line 5—5, Fig. 12.
Fig. 6 is a perspective view showing the rear setting gage for use in holding the rear end of the tap in place when mounting the same in the machine preparatory to operating the machine.
Fig. 7 is a fragmentary perspective of the front setting gage which is used temporarily for centering and holding the front part of the tap in place while setting up the machine for use.
Figures 13, 15:
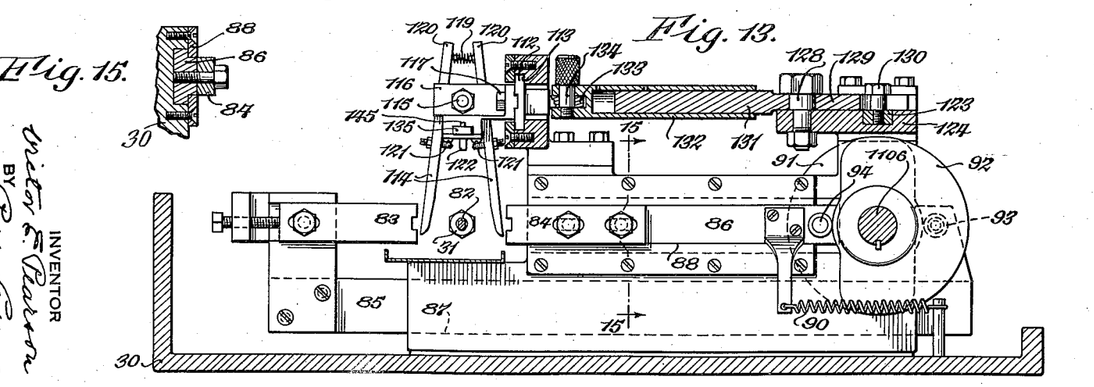
Fig. 13 is a similar view, taken on line 13—13, Fig. 4 but showing the nut stripping mechanism in another position.
Fig. 15 is a fragmentary vertical section, taken on line 15—15, Fig. 13.
Figure 14:
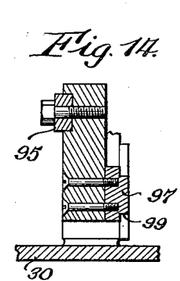
Fig. 14 is a fragmentary vertical section, taken on line 14—14, Fig. 12.
Figure 16:
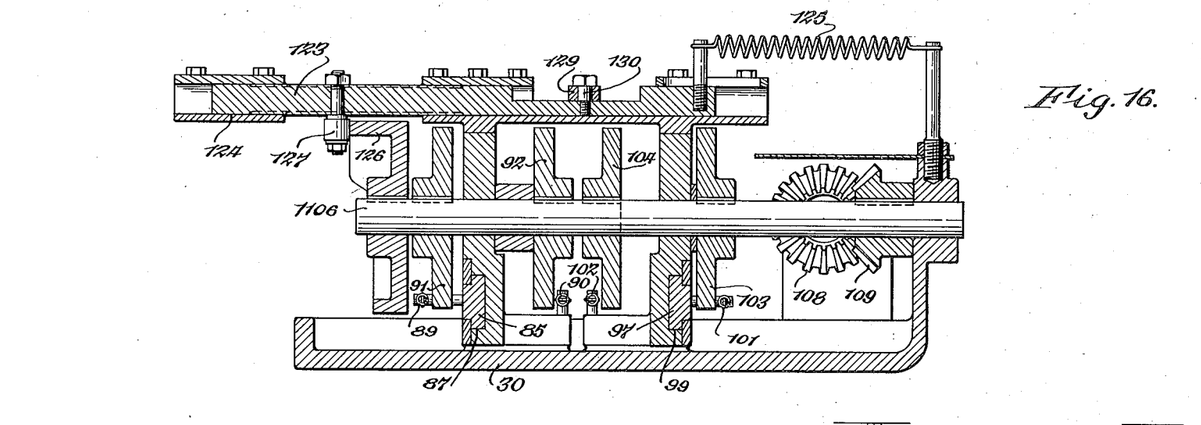
Fig. 16 is a vertical longitudinal section, taken on line 16—16, Fig. 4.
Figure 17:
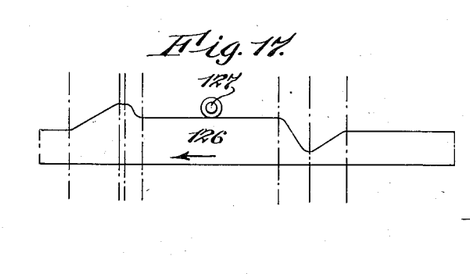
Fig. 17 is a diagrammatic view showing the construction of the cam forming part of the mechanism for shifting the stripping fingers lengthwise of the tap.

In the preferred construction of this machine a straight tap is employed in which the shank 82 of the tap and its cutters 55 are arranged on a straight line and the shank which is of smaller diameter than the cutters and of cylindrical form extends rearwardly from the same, as shown in Fig. 8. The nuts to be threaded are fed onto the front end of the cutters, then pass rearwardly successively over the cutters and shank thereof and are finally discharged from the rear end of the shank. To permit of using such a tap means are provided for alternately holding the tap at different points in the length of the shank in order to enable the nuts to clear the tap. Although various means may be employed for this purpose those shown in Figs. 1, 4, 8, 12, and 13 are preferred and constructed as follows:

The numerals 83, 84 represent a pair of front holding jaws which are adapted to engage with the transversely opposite sides of the front part of the tap shank and are movable horizontally toward and from the same for gripping and releasing the tap. For this purpose these holding jaws are mounted on two transversely movable slides 85, 86 which are guided in ways 87, 88 on the adjacent part of the main frame and yieldingly moved in a direction for engaging the tap shank by springs 89, 90 connecting these slides respectively with an adjacent part of the main frame, as shown in Figs. 4 and 13.

The slides are positively moved in the opposite direction for engaging the front holding jaws with the tap shank by means of rotary cams 91, 92 arranged side by side and engaging their peripheries respectively with pins 93, 94, on the slides 85, 86.

A similar pair of rear tap holding jaws 95, 96 is provided for engaging with the opposite sides of the rear part of the tap shank, these last-mentioned jaws being respectively mounted on transversely movable slides 97, 98 which are guided in ways 99, 100 on the adjacent part of the main frame. These last-mentioned holding jaws are yieldingly moved away from the tap shank by springs 101, 102 connecting the slides 97, 98 respectively, with the main frame and the same are moved positively into engagement with the opposite sides of the tap shank by rotary cams 103, 104 arranged side by side and engaging respectively with pins 105, 106 on the slides 97, 98. The cams 91, 92 and 103, 104 are so timed that the two pairs of holding jaws engage alternately with the tap shank and that the latter is gripped by one pair of jaws while the other pair is released therefrom, but during a brief time both pairs of jaws engage with the tap shank so that the latter at no time is free but instead is gripped by one pair or the other of said holding jaws.

Figure 18:
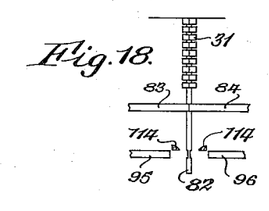
Figs. 18, 19, 20, and 21 are diagrammatic views showing various relative positions of the nut stripping fingers and the tap holding mechanism during different stages of the operation of the machine.
Figure 19:
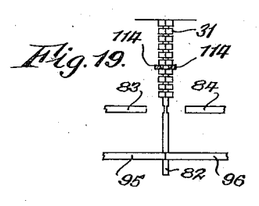
Figure 20:
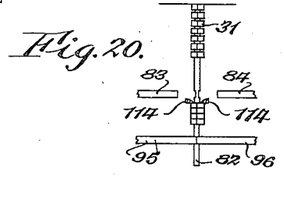

As shown in Fig. 18 the front jaws are engaged with the tap shank and the rear jaws are disengaged therefrom during which time nuts accumulate on the front part of the shank and any nuts on the rear part thereof are free to be discharged therefrom. Subsequently the front pair of jaws are disengaged from the tap shank and the rear jaws are engaged therewith, as shown in Figs. 19 and 20, at which time some of the nuts are moved from the front part of the tap shank past the front jaws and into a position between the front jaws and rear jaws, as shown in Fig. 20, preparatory to discharging these nuts when next the rear jaws are disengaged from the tap shank in the manner described.

The several tap holding cams 91, 92, 103, 104 are turned in unison by mounting the same on a horizontal cam shaft 1106 which is journaled lengthwise on the main frame and derives motion from any suitable source through a transmitting mechanism consisting in the present case of a transverse intermediate shaft 107 journaled on the main frame, a pair of intermeshing bevel gear wheels 108, 109 secured respectively to the shafts 107, 1106, and a driving belt 110 passing around a driving pulley 111 on the intermediate shaft.

A nut shifting or propelling mechanism embodying one feature of the present improvement whereby the nuts are progressively moved from the front part to the rear part of the tap shank and finally discharged from the rear end thereof during the operation of the machine is provided. These means in their most approved form are best shown in Figs. 1, 4, 5, 8–21 and constructed as follows:

The numeral 112 represents a carriage which reciprocates horizontally and lengthwise of the tap shank and is guided in a way 113 on the main frame at one side of the tap shank. On this carriage are mounted two shifting levers having two upright lower stripping fingers or arms 114 which are arranged on opposite sides of the tap shank and are adapted to move transversely toward and from opposite sides of the tap shank and also to reciprocate in unison lengthwise thereof. These shifting levers are pivotally connected above the tap shank by means of a single pivot screw or bolt 115 with a bracket 116 which is mounted on the carriage 112 so as to be capable of longitudinal adjustment thereon, this being preferably accomplished by adjusting screws 117 engaging this carriage and passing through longitudinal slots 118 in the bracket 116.

The lower arms or fingers of the shifting levers are moved toward each other and toward opposite sides of the tap shank by spring means consisting preferably of a spring 119 interposed between the upper arms 120 of the shifting levers which project upwardly from the axes of the same, as shown in Fig. 11. The movement of the lower arms or stripping fingers of the shifting levers is controlled so that the same do not come into engagement with the tap shank, this being effected by means of adjustable stop screws 121, 121 mounted on the stripping fingers and adapted to engage with opposite sides of a stop lug 122 on the adjacent part of the carriage bracket 116, thereby preventing undue wear on the fingers and tap shank.

Reciprocation of this carriage 112 and the parts mounted thereon is effected in accordance with this invention by the following means:

The numeral 123 represents a stripper actuating slide which moves in a horizontal longitudinal guideway 124 on the upper part of the main frame and is actuated in one direction by a spring 125 which connects this slide with a stationary part of the main frame and in the opposite direction by a rotary cam 126 which is mounted on the cam shaft 1106 and engages with a pin 127 on the stripper actuating slide 123.

Motion is transmitted from the slide 123 to the carriage 112 by an intermediate multiplying rock lever which is pivoted by a vertical screw 128 to the adjacent part of the main frame and has one arm 129 of fork shape which engages with a screw or pin 130 on the actuating slide 123 and another arm of telescopic form and comprising an inner section 131 which is integral with the forked arm 129 and a tubular outer section 132 which slides lengthwise on said inner section and is pivotally connected at its outer end with a lug 133 on the stripper carriage 112 by means of a pivot pin or screw 134, as best shown in Fig. 13.

As the cam 126 rotates the actuating slide is reciprocated and this movement is transmitted to the stripper carriage by the intermediate multiplying lever due to arm 129 being comparatively short and its telescopic arm being relatively long.

During the forward stroke of the stripping fingers the same are open or spread apart so that they clear the nuts on the tap shank and at the end of this stroke these fingers close or approach each other and come close to opposite sides of the tap shank so that they stand in front of the adjacent nuts which may at this time be on the tap shank. During the subsequent rearward stroke of the stripper fingers the same push rearwardly any nuts which may be on the tap shank in rear of the closed stripper fingers which are closed at this time and ultimately discharge the same from the rear end of the tap shank.

At the end of the rearward stroke of the stripper fingers the same are opened or spread apart so that the same are out of the path of the screw nuts on the tap shank and are free to effect a subsequent forward stroke without interfering with the nuts on the tap shank.

The opening and closing of the stripper fingers for this purpose may be accomplished by any approved means but satisfactory means are shown for this purpose in the drawings and these are constructed as follows:

The numeral 135 represents a stripper controlling cam or wedge which slides in a guideway 136 on the underside of the stripper bracket 116, so as to be capable of horizontal longitudinal movement relatively to the carriage 112, and is provided with a tapering or wedge shaped front end 137 and a blunt or square faced rear end 138, while the intermediate part of this wedge has parallel sides 139, as shown in Fig. 9.

In front and in rear of the path of the controlling wedge are arranged front and rear abutments or stops 140, 141 having preferably the form of screws which are adjustably mounted on stationary arms 142, 143 forming part of the main frame of the machine.

During the normal operation of the machine the controlling wedge 135 during its forward stroke with the stripper carriage is moved into its forward position on the bracket of the stripper carriage so that its wedge or cam-shaped front end 137 is in front of the stripper fingers and the latter engage opposite parallel sides 139 of the wedge, as shown by full lines in Figs. 9 and 13. While the parts are in this position the stripper fingers are spread apart and move forwardly without interfering with the nuts on the tap shank. During the last part of the forward stroke of the stripper carriage the front end of the controlling wedge 135 engages the front stop 140 and is arrested thereby so that the stripper fingers, during the last part of their continuing forward movement with the stripper carriage independently of the controlling wedge, will be moved from the longitudinal parallel sides of the wedge to the tapering front end of the same whereby the spring 119 will close the stripper fingers, as shown by dotted lines in Fig. 9 and by full lines in Figs. 11 and 12.

During the subsequent rearward stroke of the stripper carriage with the stripper fingers closed the latter engage with the front side of an adjacent nut on the tap shank and push this nut together with those in rear thereof on the tap shank and ultimately discharge these nuts from the rear end of the latter. As the stripper carriage nears the rear end of its stroke the blunt rear end 138 of the controlling wedge 135 engages the rear stop or abutment 141 and is arrested thereby while the stripper carriage continues to move rearwardly for a short distance independently of this wedge, whereby the stripper fingers are again moved from the narrow front part of the wedge to the wide part of the same, whereby the stripper fingers are again spread, as shown in Figs. 9 and 13, preparatory to effecting the next following idle forward stroke of the same.

By adjusting the bracket 116 lengthwise on the carriage 112 and likewise adjusting the stops 140, 141 on the arms 142, 143, the operation of the stripper fingers can be accurately timed to suit different heights of nuts which are being threaded and also meet other varying conditions.

In order to prevent accidental displacement of the controlling wedge from its guideway the same is provided with retaining pins 144, 145 adapted to engage with the front and rear side of the bracket 116 in case of excess movement and thus prevent complete detachment of the wedge from its guideway. The construction of the cam 126 is such that in the operation of the nut stripping mechanism the stripper fingers 114 come to rest in an open position immediately in front of the rear pair of tap holding jaws while the latter are released from the tap shank and the front pair of holding jaws is gripping this shank, as shown in Fig. 18. After the rear pair of holding jaws has gripped the tap shank and the front pair has released the same the stripper fingers move the last step into their foremost position and close so as to engage the front side of a nut on the adjacent part of the tap, as shown in Fig. 19. The stripper fingers now move rearwardly one step and come temporarily to rest in a position immediately in rear of the front pair of holding jaws, whereby the batch of nuts in rear of the fingers are carried into a position between the pair of front jaws which at this time are open and the rear pair of the same which are closed, as shown in Fig. 20.

Figure 21:
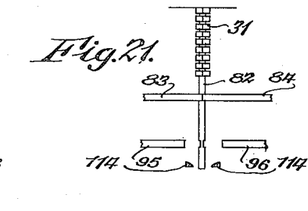

Thereafter the front jaws are closed on the tap shank and the rear jaws are released therefrom, and the stripper fingers while still in a closed position effect the second step or final part of their rearward movement and push the respective batch of threaded screw nuts from the rear part of the tap shank, as shown in Fig. 21, and then the stripper fingers effect the first step of their forward movement and come to a position between the open pair of rear holding jaws and the closed pair of front jaws, as shown in Fig. 18, preparatory to beginning the next cycle of operations of the nut stripping mechanism. A satisfactory formation of the cam 126 for this purpose is shown diagrammatically in Fig. 17, but if desired other suitable timing may be employed.

In the modified construction shown in Fig. 25 the rolling members of the bearing whereby the driving head is mounted on the main frame consist of balls 166 instead of rollers 66, as shown in Fig. 8. This figure also shows the rim 175 of the housing for the driving head and driving mechanism therefor made separate from the rear wall 170 of this housing instead of integral therewith, as shown. In Fig. 25 the front and rear packings 177, 179 between the front walls 172 of the housing and the front side of the driving head and between the bushing 178 and the rear side of the driving head are also somewhat modified as compared with the construction shown in Fig. 8.

If desired two separate rolling bearings may be interposed between the driving head 146 of the spindle and the adjacent part 147 of the main frame or housing, one of such bearings 148 being arranged between the head driving wheel 149 and the front packing 150 and the other bearing 151 being arranged between said driving wheel and the rear packing 152, as shown in Fig. 26.

For convenience in properly locating the screw threading tap when setting up the machine preparatory to threading a particular size nut, front and rear gages are temporarily employed. The front gage 153, shown in Figs. 7 and 8, has the form of an upright bar which has a forked lower end 154 adapted to receive the front part of the tap shank and hold it centrally with reference to the driving spindle while the upper part of this gage is slidably secured in a loop 155 on the upper part of the main frame and adapted to be held either in its lower operative or in its elevated inoperative position by means of a spring pressed retaining device 156. The rear gage 157, shown in full lines in Fig. 6 and by dotted lines in Fig. 4, has the form of a tubular socket which temporarily receives the rear end of the tap shank, as shown in Fig. 4, and is held in place by a laterally projecting arm 158 on this socket secured to the adjacent stationary part of the frame of the machine by a thumb screw 159. When the machine is in operation both these gages are disengaged from the tap shank and so disposed that the same do not interfere with the operation of the machine.

I claim:

1. A nut threading machine comprising a tap having screw thread cutters, and a hollow driving spindle having a tubular hub adapted to receive said nuts and arranged in front of said cutters and a plurality of arms projecting rearwardly from said hub and around said cutters and said arms being provided on their inner sides with lands adapted to engage with corners of said nuts and separated from each other by clearance passages for the escape of chips, and the space around the exterior of said arms being unobstructed and the rear ends of said arms being disconnected from each other.

2. A nut threading machine comprising a tap having screw thread cutters, a hollow driving spindle having a front tubular hub and rear arms surrounding said cutters and spaced from each other by clearance passages for chips and provided with internal lands for engaging the corners of the nuts, a driving head provided with an axial bore in the front part of which said hub is mounted, the rear part of said bore being spaced from the exterior of said arms to render visible said cutters through said clearance passages, a driving wheel mounted on said driving head, a housing surrounding said driving head and wheel, packings interposed between opposite ends of said housing and said head, and bearing means interposed between said packings for journaling said driving head on said housing.

3. A nut threading machine comprising a tap having screw thread cutters, a hollow driving spindle having a front tubular hub and rear arms surrounding said cutters and spaced from each other by clearance passages for chips and provided with internal lands for engaging the corners of the nuts, a driving head provided with an axial bore in the front part of which said hub is mounted, the rear part of said bore being spaced from the exterior of said arms to render visible said cutters through said clearance passages, a driving wheel having a web connected with the front part of said head and a rim projecting rearwardly from said web, a frame having a housing surrounding said driving head and wheel, a front packing interposed between the front parts of said driving head and housing, a rear packing interposed between the rear parts of said driving head and housing, and rolling bearing means interposed between said packings for journaling said driving head on said housing.

4. A nut threading machine comprising a tap having screw thread cutters, a hollow driving spindle having a front tubular hub and rear arms surrounding said cutters and spaced from each other by clearance passages for chips and provided with internal lands for engaging the corners of the nuts, a driving head provided with an axial bore in the front part of which said hub is mounted, the rear part of said bore being spaced from the exterior of said arms to render visible said cutters through said clearance passages, a driving wheel mounted on the central part of the exterior of said driving head, a front packing interposed between the front parts of said head and housing, a rear packing interposed between the rear parts of said head and housing, a front rolling bearing for journaling said head on said housing between the front packing and said wheel, and a rear rolling bearing for journaling said head on the housing between the rear packing and said wheel.

5. A nut threading machine including a stationary thread cutting tap, a nut driving spindle having a longitudinal bore which receives said tap and through which the nuts are moved lengthwise of said tap and said spindle having lands adapted to engage the sides of the nuts for turning the same and also having passages extending from its bore to its periphery through which chips cut from the nuts pass laterally from the interior of the spindle to the exterior thereof, and a rotary driving head on which the driving spindle is mounted and which is provided around said passages in the spindle with a longitudinally flaring bore against which the chips are discharged from said passages and upon which the chips are caused to move lengthwise and escape from the large end of said flaring bore by centrifugal force during rotation of said head.

6. A nut threading machine including a stationary thread cutting tap, a nut driving spindle having a longitudinal bore which receives said tap and through which the nuts are moved lengthwise of said tap and said spindle having lands adapted to engage the sides of the nuts for turning the same and also having passages extending from its bore to its periphery through which chips cut from the nuts pass laterally from the interior of the spindle to the exterior thereof, a rotary driving head on which the driving spindle is mounted and which is provided around said passages in the spindle with a longitudinally flaring bore against which the chips are discharged from said passages and upon which the chips are caused to move lengthwise and escape from the large end of said flaring bore by centrifugal force during rotation of said head and a frame in which said head is journaled and which is provided with an annular channel which receives said chips from the large end of said flaring bore of the driving head.

VICTOR E. PEARSON.